Feb. 28, 1967  G. J. JOHNSON  3,306,263
RECIRCULATING LIVE-STOCK WATERING SYSTEM
Filed April 22, 1965  2 Sheets-Sheet 2

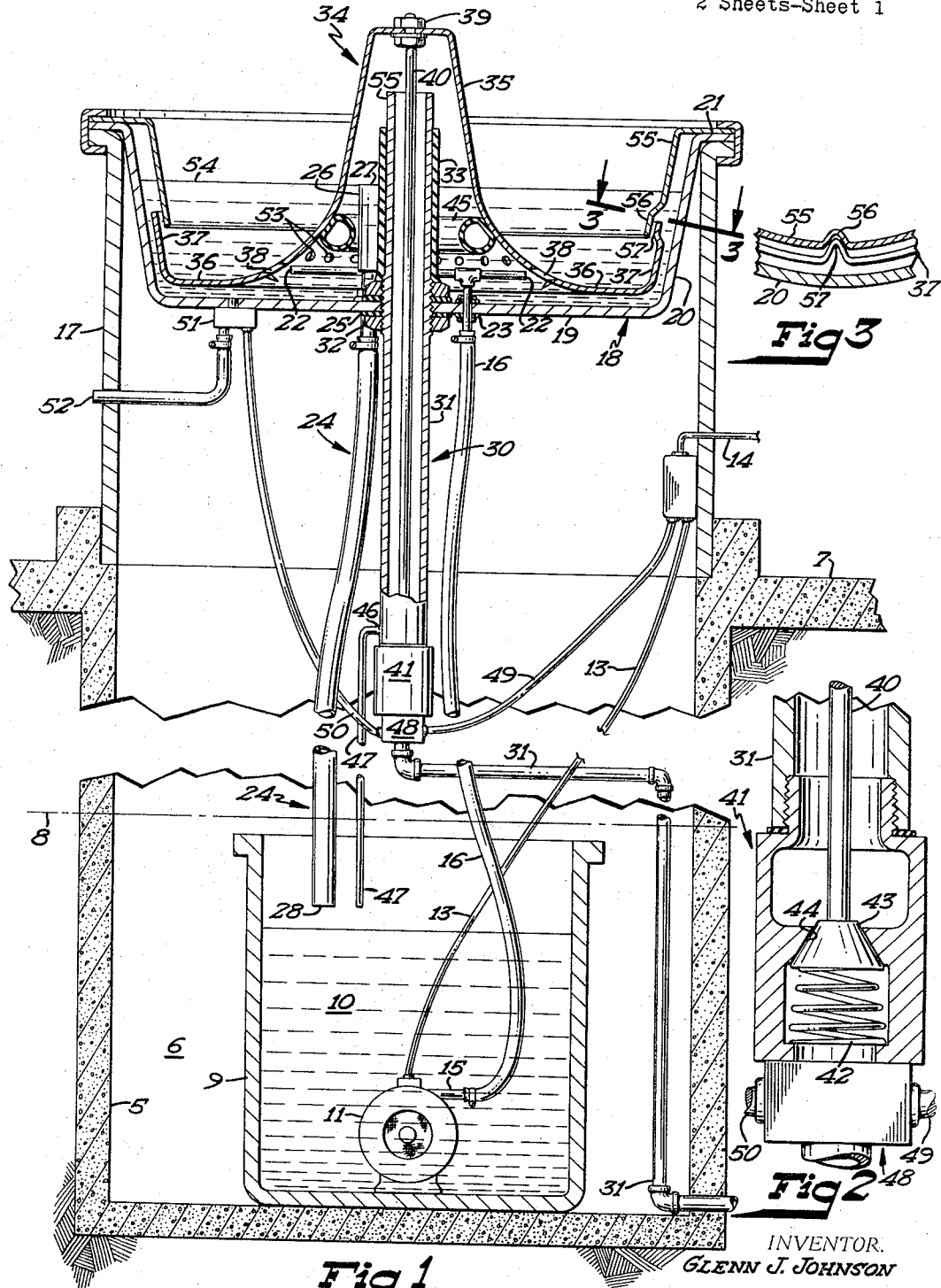

INVENTOR.
GLENN J. JOHNSON
BY Schroeder, Siegfried
& Ryan  ATTORNEYS

United States Patent Office 3,306,263
Patented Feb. 28, 1967

3,306,263
RECIRCULATING LIVE-STOCK WATERING SYSTEM
Glenn J. Johnson, Rte. 2, Powell, Wyo. 82435
Filed Apr. 22, 1965, Ser. No. 450,051
16 Claims. (Cl. 119—73)

This invention relates to live-stock watering systems. More particularly it relates to live-stock watering systems of the recirculating type designed to prevent freeze-up under unusually low temperature conditions.

Weather involving unusually low temperature conditions presents difficult problems for ranchers and the like who winter their animals out of doors and consequently must maintain an open supply of water for their animals. Most water systems become frozen in such inclement weather and as a consequence, either the live-stock must depend upon snow, etc. for their moisture or positive steps must be taken by the owner to alleviate the situation. This is costly and at times impossible for extended periods. Moreover, I have found that even if provisions are made through novel design of a live-stock watering system to prevent such freeze-overs, health authorities will not approve many such systems for various reasons. My invention is intended to obviate these problems.

It is a general object of my invention to provide a novel and improved live-stock watering system.

A more specific object is to provide a novel and improved live-stock watering system which is simple and inexpensive to manufacture, assemble, install, and operate.

A still more specific object is to provide a novel and improved live-stock watering system which is relatively inexpensive and can be used without attention over prolonged periods and with full assurance that it will remain open and provide water for the animals during even extremely low temperature conditions.

Another object is to provide a novel and improved watering system which recirculates the water from a container below the frost level for the purpose of preventing freeze-overs and, in addition, agitates the water within the drinking bowl in an improved manner so as to more effectively prevent the water from freezing.

Another object is to provide a novel and improved watering system having improved means for preventing the animals from having access to the critical and heretofore normally exposed parts of the system so as to more adequately protect such parts from damage by the animals and preclude fouling thereof as a result of such exposure.

Another object is to provide a novel and improved watering system having inherent features which automatically drain the same in the event the pressurized source of water supply fails.

Another object is to provide a uniquely designed improved watering system which meets the demands of health authorities by being constructed so as to obviate the possibility of contamination of the source of supply of water and more effectively prevent debris and the like from entering the critical operating parts of the system.

These and other objects and advantages of my invention will more fully appear from the following description, made in connection with the accompanying drawings, wherein like reference characters refer to the same or similar parts through the several views, and in which:

FIG. 1 is a vertical sectional view with portions broken away of the preferred embodiment of my invention;

FIG. 2 is a fragmentary vertical sectional view on an enlarged scale of the control valve disposed within the fresh water supply conduit;

FIG. 3 is a fragmentary sectional view taken along line 3—3 of FIG. 1;

Figures 4, 5:
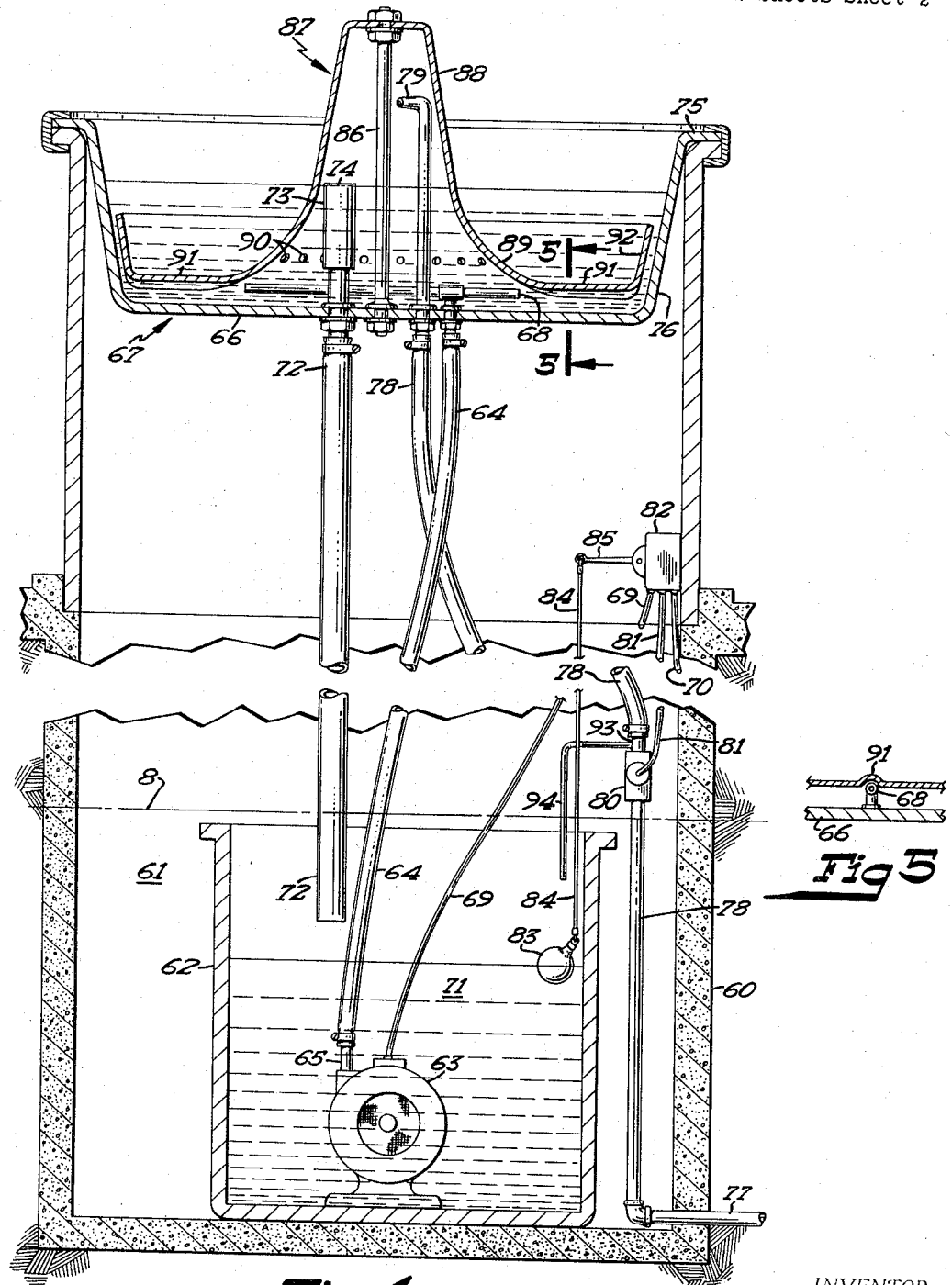
FIG. 4 is a vertical sectional view of a second embodiment of my invention with portions broken away.
FIG. 5 is a vertical sectional view taken along line 5—5 of FIG. 4.

The preferred embodiment of my invention which is shown in FIGS. 1–3 includes a tubular member 5 which defines a pit 6 in the earth identified by the numeral 7. The frost line has been indicated by the numeral 8. Mounted at the bottom of the pit 6 is a container 9 which, as shown, is removable from the pit and contains water indicated by the numeral 10 and an electrically driven sealed pump 11. The electric motor (not shown) for the pump 11 is connected by an electric cable 13 to a source of electric power indicated by the numeral 14. The pump 11 has a water inlet (not shown) and a discharge 15 to which a conduit 16 is attached.

A corrugated tubular housing member 17 is mounted upon the upper surface of the earth 8 directly over the pit 6, as shown. Secured within the upper end of the housing 17 is a watering bowl 18 having a closed bottom 19, annular side walls 20 and annular upper edges 21. The conduit 16 extends upwardly into the watering bowl 18 through its bottom 19 and terminates in a T-shaped discharge 22. The conduit 16 extends through the bottom 19 through an opening provided in the latter therefor, and is sealed within the opening through the use of a conventional seal indicated by the numeral 23.

Depending from the watering bowl 18 is a return-flow conduit 24. As shown, the return-flow conduit 24 also extends upwardly into the watering bowl 18 through its bottom 19 through an opening provided therefor and is sealed relative to the bottom by means of a conventional seal indicated by the numeral 25. The return-flow conduit 24 includes an open ended rubber sleeve 26 which is slidably received at the upper end of the conduit 24 and is frictionally held against relative longitudinal movement. The upper end of the sleeve 26 defines an inlet 27 for the return-flow conduit 24 and the elevation of this inlet 27 is adjustable by the simple expedient of moving the sleeve 26 longitudinally of the lower rigid portion of the conduit 24 while overcoming the friction therebetween. It will be noted that the inlet 27 is disposed above the bottom 19 of the watering bowl 18 and below the upper edges 21 thereof. In this manner a supply of water is maintained within the watering bowl at all times while the level of the water therein is prevented from extending substantially above the upper end of the conduit 24. The lower end 28 of the conduit 24 discharges into the container 9.

The water supply means which I utilize is indicated generally by the numeral 30 and includes a pressurized source of water supplied to a rigid conduit 31, which conduit extends upwardly through the bottom 19 of the watering bowl 18 at a central point and extends upwardly to a point well above the inlet 27 of the return-flow conduit 24. As shown, the conduit 31 extends through the bottom 19 through a hole provided for that purpose and is secured fixedly therein by means of a conventional gasket or seal 32. A rubber sleeve 33 extends around the conduit 31 and upwardly from the seal 32 a substantial distance.

Also included in the water supply means is a sombrero-shaped hood member 34 which has an upwardly extending closed crown portion 35 and annular peripherally extending brim portions 36, the outer extremities 37 of which extend upwardly and annularly around the periphery of the hood member, as shown. As shown, the brim portions 36 extend to a point closely adjacent the bottom 19 of the watering bowl 18 and upwardly along the side walls 20. Openings 38 are formed in the brim portions of the hood member 34 directly opposite the openings of the discharge 22 of the pump conduit 16 so that the water emanating from the discharge 22 is directed into the openings or passages 38 and flows outwardly beyond the hood member 34 to create turbulence thereabove in the water at the exterior thereof. This turbulence facilitates the prevention of ice during sub-normal temperature conditions. Likewise, the forcing of water in a flow outwardly of the hood member 34 through the passages 38 results in an inward flow and current through the openings 53 of the hood member.

Fixedly secured to the crown portion 35 of the hood member 34 by means of a nut 39 is an actuating rod 40 which extends downwardly through the water supply conduit 31 and is connected to a valve member indicated generally by the numeral 41 disposed in the lower portion of the conduit 31. The valve 41 is of the type currently on the market and sold by Barnes Manufacturing Co., Mansfield, Ohio. This valve is identified on the market as "Foot Valve—81–3920A." It will be appreciated, of course, that other suitable valves may be utilized but I have found this particular valve is well suited for the purpose and functions required.

This valve member 41 is constantly urged toward closed position by a spring member 42 so that the valve element 43 is at all times urged toward the valve seat 44 and closed position. In addition, the valve element 43 and the rod 40 are urged upwardly, when an adequate supply of water is contained within the watering bowl 18, by the head of air contained in the crown portion 35 of the hood member 34 as well as by the upward urging of the annular float member 45 which surrounds the conduit 31 and the return-flow conduit 24 and engages the inner surface of the hood member 34, as shown, to urge the latter upwardly as a result of the buoyancy of the water displaced thereby. As shown, I utilize a rubber tube filled with air as the float member 45 although, of course, it will be appreciated that other materials lighter than water in density may be utilized for the same purpose.

It should be noted that immediately above the valve member 41 there is a weep hole 46 in the conduit 31 which is connected by a small tube 47 with the container 9 so that the water may drain out of the upper portions of the conduit 31 into the container and thereby prevent freezing of water within the upper portions of the conduit 31 during the period that the valve 43 remains closed. This may be the result of no water being drunk by animals from the watering bowl 18.

It should also be noted that a pressure switch indicated generally by the numeral 48 is provided within the conduit 31, this switch being of the type currently on the market and sold by Consolidated Controls Corporation, 75 Durant Avenue, Bethel, Connecticut and identified as "Pressure Switch Type 6607." This type of pressure switch is responsive to the pressure exerted by the water within the conduit 31 and, as shown, is connected by an electric line 49 to the source of electric current 14. It is also electrically connected by an electric line 50 to a solenoid valve 51. This solenoid valve 51 is mounted upon the bottom 19 of the watering bowl 18 and communicates with the interior of the latter by means of an aperture provided therefor in the bowl so as to drain the latter when in open position. The solenoid valve 51, of course, is normally in closed position but when actuated by the pressure switch 48 which closes in the event of failure of water supply it moves to open position and drains the contents of the watering bowl 18, the drain hose 52 carrying the water outwardly through the housing 17 through an opening provided therefor.

It will be noted that there are a plurality of circumferentially arranged apertures 53 formed adjacent the base of the crown portion 35 of the hood member 34. These apertures extend through the hood member and bring the interior thereof into communication with the exterior. It should be noted that the apertures are disposed at a level below the inlet 27 of the return-flow conduit 24 and above the brim portions 36 of the hood member.

Secured to the upper edge of the watering bowl 18 and depending inwardly therefrom is an annular collar 55 which is spaced from the annular side walls 20 and extends downwardly below the upper edges of the annular upstanding portions 37 of the hood member 34. This collar 55 prevents dirt, debris, and the like from floating into the space between the portions 37 and the side walls 20. It also has an indented or grooved area 56 which is disposed opposite and cooperates with a corresponding grooved area 57 of the annular portions 37 to prevent relative rotation or circumferential movement therebetween.

I have found that the live-stock watering system described above functions in an improved manner and meets all of the sanitary requirements including the most rigid requirements established in the dairy industry. It will be appreciated that so long as the upper level of the water indicated by the numeral 54 is at the level of the inlet 27, the float member 45 will be urged upwardly by the buoyancy of the water displaced thereby and that as a consequence the hood member 34 and the rigid actuating rod 40 will be urged upwardly to maintain the valve element 43 in closed position, thereby preventing the entrance of additional water into the watering bowl 18. However, when an animal lowers the level 54 by drinking water from the watering bowl 18, the float element 45 will no longer engage and urge the hood member 34 upwardly sufficiently to maintain the valve element 43 in closed position. In fact, the weight of the hood member and the weight of the water contained between the upwardly extending peripheral portions 37 and the crown portion 35 is sufficient to overcome the urging of the spring 42 and the head of air within the crown portion 35 and consequently the valve element 43 will be moved downwardly to open position, thereby permitting water to be forced upwardly through the conduit 31 and discharged through its discharge 55 into the interior of the hood member 34.

It will be appreciated that the lowering of the water level 54 permits the air that is trapped within the hood member 35 to expand which further diminishes the lifting effect thereof until an additional supply of water has been supplied through the discharge 55. As soon as adequate water has been introduced through the discharge 55 as a result of the valve element 43 being opened as described to bring the water level up to the inlet 27, the float member 45 combined with the urging of the spring 42 and that of the air within the crest portion 35 will cause the hood member 34 to be moved upwardly and carry the valve element 43 into closed position. It will be noted that the water discharged into the interior of the hood member 34 is free to pass outwardly through the openings 53 and also outwardly through the spacing between the upwardly extending annular portions 37 of the hood member and the side walls 20 of the watering bowl 18, as well as outwardly through the water pasages 38.

When the flow of water upwardly through the conduit 31 is cut off by closing of the valve element 43 as described above, the water which remains within the upper portion of the conduit 31 above the weep hole 46 immediately proceeds to drain downwardly through the tube 47 and is discharged into the container 9.

It will be understood that the pump 11 constantly circulates the water between the watering bowl 18 and the container 9 by forcing the water upwardly through the conduit 16 and discharging the same through the discharge 22. The water discharged therethrough is directed through the passages 38 to create the turbulence herein before described and the excess water enters the inlet 27 of the return-flow conduit 24 to return the same to the container 9. In this manner the water is constantly agitated and warmer water is being constantly brought upward from the container 9 and discharged into the interior of the watering bowl 18 so as to preclude the same from freezing over in unusually cold temperatures.

It will be noted that the discharge of the relatively warm water from the container 9 to the discharge 22 and outwardly into the exterior of the hood member 34 provides an excess of water exteriorly of the hood member. This water may re-enter the hood member through the openings 53 which are relatively small and which serve to prevent the entrance of debris and the like into the area immediately surrounding the water supply discharge 55, the inlet 27, and the discharge 22. In this manner these elements are protected against fouling. It will also be noted that the hood member 34 serves to protect these critical portions of the system against damage from the animals as they mill about the watering bowl.

The second embodiment of my invention as shown in FIGS. 4–5 is quite similar in construction to that hereinbefore described except that the control of the water supply is somewhat different. As shown, it includes a similar tubular member 60 which defines a pit 61 in the earth. A container 62 is removably disposed within the bottom of the pit below the frost line and an electrically driven pump 63 constantly pumps water upwardly through a conduit 64 connected to the discharge 65 of the pump. The conduit 64 extends upwardly through the bottom 66 of the watering bowl, indicated generally by the numeral 67, and terminates in a T-shaped discharge 68. An electric line 69 extends from the pump to the source of electric power 70. The water 71 within the container 62 is returned from the watering bowl 67 by a return-flow conduit 72 which likewise extends upwardly through the bottom 66 of the watering bowl 67 and terminates in an upright rubber sleeve 73 having an inlet 74 at its upper end. This sleeve is held in place by friction between an end and the lower portion of the conduit. The inlet is disposed at a level above the bottom 66 and below the upper edges 75 of the side walls 76 of the watering bowl.

A pressurized source of water 77 is supplied through the water supply conduit 78 which extends upwardly through the bottom 66 of the watering bowl and terminates in a discharge 79 which, it will be noted, is well above the inlet 74. A solenoid valve 80 is disposed within the conduit 78 and is connected to the source of electric power 70 by means of an electric line 81. Incorporated within the line 81 is a switch 82 which is normally open but is moved to closed position by the float member 83 attached thereto by a line 84 when the float member is lowered as a result of the supply of water 71 becoming diminished. When the float member is lowered as described, the switch 82 is closed by the arm 85 attached to the switch being pulled downwardly and as a consequence, the solenoid valve 80 is opened, permitting water to flow upwardly through the conduit 78 and to be discharged through the discharge 79 to replenish the supply of water.

Fixedly mounted upon the bottom 66 of the watering bowl 67 and supported thereupon a rigid rod 86 is a sombrero-shaped hood member 87 having a closed crown portion 88 and annular brim potrions 89. A plurality of apertures 90 are formed in the crown portion and are arranged circumferentially of the hood member adjacent the base of the crown portion, as shown. In addition, a pair of water passages 91 are formed in the lower surface brim portions 89 and are disposed directly opposite the discharge 68 of the pump conduit 64 so that the water therefrom will be directed outwardly through these passages. As the water directed outwardly through the passages 91 reach the outer confines of the hood member 87 it is directed upwardly by the side walls 76 and passes between these side walls and the upwardly extending annular portions 92 of the hood member 87. In this manner considerable turbulence and attendant aeration is induced into the water and circulation is increased since the excess water in order to reach the inlet 74 must return through the aperture 90 or else descend again between the upstanding peripheral portions 92 of the hood member and annular side walls 76 of the watering bowl.

In operation, this second embodiment of my invention functions in a similar manner to insure that the watering bowl will not freeze over in unusually low temperature conditions. So long as no animals are reducing the supply of water by drinking from the watering bowl 67, the level of water 71 in the container 62 will remain sufficiently high to support the float member 83 and maintain the switch 82 in opened position. As a consequence, the valve 80 will remain closed and the water 71 will be recirculated by the pump 63, being discharged through the discharge 68 and being returned to the container 62 through the inlet 74 and the conduit 72. When the supply of water is reduced by an animal drinking from the watering bowl, the level of the water in the bowl will be reduced and consequently the supply of water normally provided through the conduit 72 to the container 62 will be cut off and the level in the container will lower with the result that the float member 83 will descend and close the switch 82, thereby opening solenoid valve 80 and permitting water to flow through the conduit 78 and to be discharged beneath the hood member 87 through its discharge 79. This additionally supplied water, in order to reach the exterior of the hood member 87, must pass outwardly through the apertures 90 or descend and flow upwardly between the side walls 76 of the watering bowl and the upstanding annular portions 92 of the hood member 87. When the supply of water has been adequately replaced, the level of water in the container 62 will again rise since the supply therein will be increased by passage of the water through the inlet 74 and conduit 72. When an adequate level is reached the switch 82 will again be closed by the normal urging of the switch toward closed position and the solenoid valve 80 will again be closed. Thereafter the supply of water remaining in the conduit 78 above the valve 80 will be drained through the weep hole 93 and the tube 94 into the container 62 so as to insure against possible freezing of the water which would otherwise remain motionless within the upper portions of the conduit 78.

From the above it can be seen that I have provided novel and improved circulating watering systems which are relatively simple and inexpensive to manufacture, assemble, install, and operate. The owner is assured of a continuous supply of circulating water under even the most extreme temperature conditions. In addition, the hood member in each of the embodiments adequately protects the critical portions of the supply system to prevent damage thereto by the animals and at the same time precludes fouling of the same by debris and the like through the straining action of the small apertures in the hood member. Moreover, by introducing the supply of fresh water at an elevated position well above the inlet of the return-flow conduits and consequently above the highest level of the water in the watering bowl, there is no possibility of contamination of the source of water supply by water being drawn backwardly through the supply line from the watering bowl. As a result, this type of circulating watering system meets all sanitation requirements prescribed by the strictest of dairy requirements.

It will, of course, be understood that various changes may be made in the form, details, arrangement and proportions of the parts without departing from the scope of my invention which consists of the matter shown and described herein and set forth in the appended claims.

What is claimed is:

1. A recirculating live-stock watering system comprising:

(a) a container disposed within the soil below the frost line thereof, (b) a watering bowl disposed in elevated relation to said container and having a bottom and side walls with upper edges, (c) water supply means connected in fluid communicating relationship with said bowl for maintaining a supply of water within said bowl and said container at all times and having a discharge discharging water directly into said bowl,
(d) pump means connected with the container and the supply of water therein and having a discharge,
(e) conduit means connected with the discharge of said pump means and terminating within said bowl and having a normally open discharge discharging the entire flow of said conduit means into said bowl,
(f) return-flow conduit means depending from said bowl and having an inlet disposed within said bowl above the bottom and below the upper edges thereof and having a discharge discharging into said container, and
(g) a sombrero-shaped hood member disposed within said watering bowl and having a centrally disposed upstanding crown portion disposed above said water supply means discharge, said pump means discharge, and said return-flow conduit means inlet and having peripherally disposed brim portions extending adjacent the bottom and side walls of said watering bowl.

2. The structure defined in claim 1 wherein said crown portion of said hood member is perforated at a level below the discharge of said return-flow conduit means.

3. The structure defined in claim 1 wherein said crown portion of said hood member is perforated circumferentially at a level below the discharge of said return-flow conduit means and the perforations therein are relatively small to exclude debris from the interior of said crown portion and facilitate the passage of water between the interior of said crown portion and the exterior thereof.

4. The structure defined in claim 1 wherein the crown portion of said hood member is imperforate at all levels above the inlet of said return-flow conduit means and said hood member is mounted for free vertical movement within said watering bowl,
(h) a floating member disposed beneath said hood member and in the water in said watering bowl and constructed and arranged to engage and urge said hood member upwardly when the level of water within said watering bowl extends to the level of the discharge of said return-flow conduit means and to disengage said hood member when the water within said watering bowl is at a level below that of the discharge of said return-flow conduit means,
(i) a flow-controlling valve disposed within said water supply means and being movable between open and closed positions and controlling the flow of water into said watering bowl from said water supply means, and
(j) means extending between said hood member and said valve in actuating relation to the latter and moving vertically with said hood member and constructed and arranged with respect to said valve to cause said valve to move to open position when the water level within said drinking bowl is below the inlet of said return-flow conduit means and to cause said valve to move to closed position when the water level in said drinking bowl extends to the inlet of said return-flow conduit means.

5. The structure defined in claim 1 wherein said water supply means includes a conduit extending from said valve to the discharge of said water supply means through which the water flows to said drinking bowl and said conduit has a weep hole formed therein adjacent and above said valve to drain the water from the portion of said conduit thereabove when said valve is closed.

6. The structure defined in claim 1 wherein the most peripheral portions of said hood member extend upwardly to contain a quantity of water between the same and said crown portion.

7. The structure defined in claim 1 wherein a water passage connecting interior of said hood member with its exterior is formed in said peripheral brim portions of said hood member and the discharge of said conduit means connected to said pump discharge is directed into said passage.

8. A recirculating live-stock watering system comprising:
(a) a container disposed within the soil below the frost line thereof,
(b) a watering bowl disposed in elevated relation to said container and having a bottom and side walls with upper edges,
(c) water supply means connected in fluid communicating relationship with said bowl for maintaining a supply of water within said bowl and said container at all times,
(d) pump means connected with the interior of said container and the supply of water therein and having a discharge,
(e) conduit means connected with the discharge of said pump means and terminating within said bowl and having a normally open discharge discharging the entire flow of said conduit means into said bowl,
(f) return-flow conduit means depending from said bowl and having an inlet disposed within said bowl above the bottom and below the upper edges thereof and having a discharge discharging into said container, and
(g) said water supply means including a water controlling valve and including vertically movable hood means within said watering bowl extending over said return-flow conduit inlet and connected in controlling relation to said valve and controlling the same through the vertical movement of said hood means and including float means associated with said hood means in actuating relation to cause said hood means to move vertically in accordance with the level of the water in said watering bowl and causing said valve to be moved between open and closed positions in accordance with the level of water within said watering bowl.

9. A recirculating live-stock watering system comprising:
(a) a container disposed within the soil below the frost line thereof,
(b) a watering bowl disposed in elevated relation to said container and having a bottom and side walls with upper edges,
(c) water supply means connected in fluid communicating relationship with said bowl for maintaining a supply of water within said bowl and said container at all times and having a discharge discharging water directly into said bowl,
(d) pump means connected with the interior of said container and the supply of water therein and having a discharge,
(e) conduit means connected with the discharge of said pump means and terminating within said bowl and having a normally open discharge discharging the entire flow of said conduit means into said bowl,
(f) return-flow conduit means depending from said bowl and having an inlet disposed within said bowl above the bottom and below the upper edges thereof and having a discharge discharging into said container, and
(g) a hood member having an upstanding portion disposed above said water supply means discharge, said pump means discharge, and said return-flow conduit means inlet and having peripheral portions extending adjacent the bottom and side walls of said watering bowl, said upstanding portion of said hood member having a plurality of relatively small apertures formed therethrough at a level below the inlet of said return-flow conduit means.

10. The structure defined in claim 9 wherein the peripheral portions of said hood member are formed into a water passage leading to the exterior of said hood member and wherein said pump means discharge is directed into said passage whereby turbulence is created within the water in said watering bowl and freezing of the same is prevented.

11. The structure defined in claim 9 wherein said drinking bowl is provided with a drain aperture, (h) a solenoid valve connected with said drain aperture in flow-controlling relation therethrough, said valve being operable between a closed position and an open position whereat the water from said drinking bowl will drain outwardly therefrom, and (i) an electrical pressure switch disposed within said water supply means in pressure-sensing relation thereto and connected in actuating relation with said solenoid valve and causing the latter to move to open position and thereby drain said drinking bowl if and when the pressure within said water supply means fails.

12. A recirculating live-stock watering system comprising:

(a) a container disposed within the soil below the frost line thereof, (b) a watering bowl disposed in elevated relation to said container and having a bottom and side walls with upper edges, (c) water supply means connected in fluid communicating relationship with said bowl for maintaining a supply of water within said bowl and said container at all times and having a discharge discharging water directly into said bowl, (d) pump means connected with the interior of said container and the supply of water therein and having a discharge, (e) conduit means connected with the discharge of said pump means and terminating within said bowl and having a normally open discharge discharging the entire flow of said conduit means into said bowl, and (f) return-flow conduit means depending from said bowl and having an inlet disposed within said bowl above the bottom and below the upper edges thereof and having a discharge discharging into said container.

13. The structure defined in claim 12 wherein the discharge of said water supply means is disposed at a level substantially above the inlet of said return-flow conduit means.

14. The structure defined in claim 12 wherein said water supply means includes a conduit extending between a supply of water under pressure and the interior of said watering bowl and a valve within said conduit a substantial distance below said watering bowl controlling the flow through said water supply conduit to said watering bowl, and a weep hole within said water supply conduit between said valve and a substantial distance below said watering bowl to drain the water out of the portion of said water supply conduit above said weep hole when said valve is closed.

15. The structure defined in claim 12 wherein said weep hole is connected in fluid communicating relationship with said container.

16. The structure defined in claim 12, said return-flow conduit means having an upper end portion with said inlet therein, and a sleeve member carried by said upper end portion of said return-flow conduit means and being adjustable longitudinally thereof to extend upwardly thereabove whereby the depth of water maintained within said bowl may be readily varied at will.

References Cited by the Examiner

UNITED STATES PATENTS

| | | | |
|---|---|---|---|
| 2,706,966 | 4/1955 | Cline | 119—74 |
| 3,027,872 | 4/1962 | Nelson | 119—81 |
| 3,049,094 | 8/1962 | Smith | 119—75 |

SAMUEL KOREN, *Primary Examiner.*

HUGH R. CHAMBLEE, *Examiner.*